(12) United States Patent
Dallmann

(10) Patent No.: US 11,002,486 B2
(45) Date of Patent: May 11, 2021

(54) SOLID-STATE HEAT EXCHANGER MODULE

(71) Applicant: DALLMANN ENGINEERING & SERVICE, Neuss (DE)

(72) Inventor: Winfried Dallmann, Neuss (DE)

(73) Assignee: DALLMANN ENGINEERING & SERVICE, Neuss (DE)

( * ) Notice: Subject to any disclaimer, the term of this patent is extended or adjusted under 35 U.S.C. 154(b) by 161 days.

(21) Appl. No.: 16/325,458

(22) PCT Filed: Aug. 1, 2017

(86) PCT No.: PCT/EP2017/069466
§ 371 (c)(1),
(2) Date: Jun. 3, 2019

(87) PCT Pub. No.: WO2018/033386
PCT Pub. Date: Feb. 22, 2018

(65) Prior Publication Data
US 2019/0285350 A1    Sep. 19, 2019

(30) Foreign Application Priority Data

Aug. 14, 2016  (EP) .................................... 16184132

(51) Int. Cl.
| F28D 7/10 | (2006.01) |
| F28D 7/00 | (2006.01) |
| F28D 7/08 | (2006.01) |
| F28F 1/04 | (2006.01) |
| F28F 17/00 | (2006.01) |
| A23B 7/005 | (2006.01) |

(Continued)

(52) U.S. Cl.
CPC ......... *F28D 7/0091* (2013.01); *F28D 7/0066* (2013.01); *F28D 7/085* (2013.01); *F28F 1/04* (2013.01); *F28F 17/005* (2013.01); *A23B 7/0053* (2013.01); *A23B 9/00* (2013.01); *A23B 9/02* (2013.01); *A23L 3/18* (2013.01); *F26B 17/12* (2013.01); *F26B 23/10* (2013.01); *F28D 7/0075* (2013.01); *F28D 7/1615* (2013.01); *F28D 2021/0045* (2013.01); *F28F 2280/02* (2013.01)

(58) Field of Classification Search
CPC ...... F28D 7/0091; F28D 7/0066; F28D 7/085; F28D 7/0075; F28D 7/1615; F28D 2021/0045; F28F 1/04; F28F 17/005; F28F 2280/02; A23B 7/0053; A23B 9/00; A23B 9/02; A23L 3/18; F26B 17/12; F26B 23/10
USPC ......................................................... 165/157
See application file for complete search history.

(56) References Cited

U.S. PATENT DOCUMENTS

| 2,269,929 | A | * | 1/1942 | Downs ................. | B60H 1/3202 62/7 |
| 3,705,620 | A | | 12/1972 | Kayatz | |
| 2012/0180990 | A1 | * | 7/2012 | Przybylski ................ | F28F 1/04 165/104.14 |

FOREIGN PATENT DOCUMENTS

| DE | 19643699 C1 | 3/1998 |
| DE | 102010023018 B3 | 5/2011 |

(Continued)

*Primary Examiner* — David D Hwu
(74) *Attorney, Agent, or Firm* — Michael P. Byrne; Wolter Van Dyke Davis, PLLC

(57) ABSTRACT

The invention relates to a novel solid heat exchanger module containing a plurality of heat exchanger tubes having a particular shape and being arranged in a special manner.

12 Claims, 6 Drawing Sheets

Figure 1:
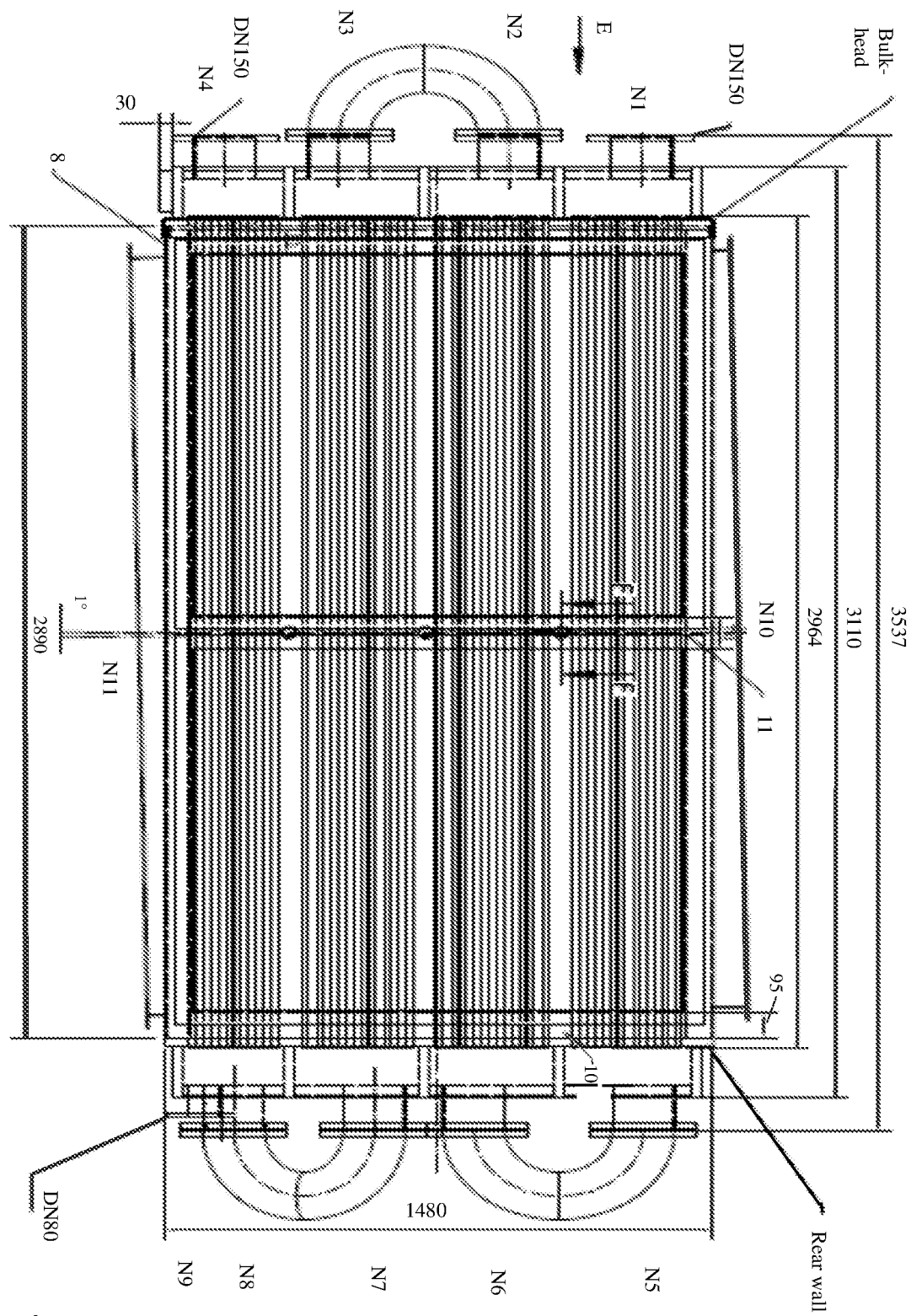

(51) Int. Cl.
    *A23B 9/02*     (2006.01)
    *A23L 3/18*     (2006.01)
    *F26B 17/12*     (2006.01)
    *F26B 23/10*     (2006.01)
    *F28D 7/16*     (2006.01)
    *F28D 21/00*     (2006.01)
    *A23B 9/00*     (2006.01)

(56) References Cited

FOREIGN PATENT DOCUMENTS

| | | |
|---|---|---|
| DE | 102009054354 B3 | 6/2011 |
| DE | 102011056334 A1 | 6/2013 |

\* cited by examiner

SOLID-STATE HEAT EXCHANGER MODULE

CROSS-REFERENCE TO RELATED APPLICATION

This application is a national stage entry of and claims priority to PCT/EP2017/069466, filed Aug. 1, 2017, which is hereby incorporated by reference in its entirety. Both this application and PCT/EP2017/069466 claim priority to EP 16184132.5, filed Aug. 14, 2016, which is hereby incorporated by reference in its entirety.

FIELD OF THE INVENTION

The invention is in the field of process engineering and relates to a heat exchanger module and a heat exchanger having a plurality of these modules for the treatment of free-flowing bulk material.

BACKGROUND OF THE INVENTION

Heat exchangers are among the most important components in the field of process engineering. They can serve different purposes, in particular cool, heat or even dry a wide variety of substrates. Heat exchangers are often distinguished by the nature of the substrates to be treated, namely, whether they are gases, liquids or solids. While gases and liquids have excellent flow characteristics, this is just not true for solids. In order to be able to subject solids to a heat exchange without melting them, they must be free-flowing. Therefore, only those substances come into consideration, which have a particle size distribution, which let these substances trickle, slip or slide or which can be milled accordingly by crushing steps.

Basically, the treatment of such free-flowing bulk materials from the perspective of the plant manufacturer is particularly ambitious, since with diameter and shape of the substrates plugging of the plants can occur at any time. Conventional solid plates heat exchangers must also be operated with purified heat or cooling media to prevent blockage of the exchangers. This makes the process more expensive, especially since vapors are usually used for the heating, which must first be condensed and cleaned.

Heat exchangers for free-flowing bulk material are sufficiently known from the prior art. Thus, for example, international patent applications WO 2007 128104 A1 and WO 2013 163752 A1 and European Patent Application EP 2995898 A2 (SOLEX) describe systems in which the drying of the bulk material, which is applied over a large feed area following the force of gravity, takes place by means of parallel organized heat exchange plates. The disadvantage here is that the bulk material passes through the heat exchange zones much too quickly, so that the system requires a serious height in order to achieve sufficient heat exchange.

A very similar module with the same disadvantages is the subject of Canadian Patent Application CA 2851781 AA (SOLEX). A combination of parallel arranged heat exchanger tubes and plates is the subject of two patent applications CA 2857852 AA and US 2016 025417 AA (SOLEX).

However, it should be noted that when it comes down to its volume, plate heat exchanger compared to tube bundle heat exchangers exhibit a broader heating area, but a poorer heat exchange, since the bulk material is not mixed as in the tube-bundle heat exchanger from one row of tubes to the next.

From DL 19643699 C1 (BABCOCK) a shaft cooler is known, in which the bulk material following the force of gravity trickles on a baffle plate and then passing a bar grate on an array of staggered cooling tubes with a square profile. The heat exchanger is characterized in particular by the fact that it has no solid wall in the region of the cooling tubes, but the outside cooling tubes are provided with wings that are inclined in the direction of the cooler interior, so that the bulk material cannot fall out. This solves the problem that the walls cannot distort due to contact with the hot bulk material and partially block the cooler. However, this construction is very complicated and also disadvantageous because the cooler is not completed and, therefore, emissions are emitted to the environment without control.

An alternative shaft cooler is described in U.S. Pat. No. 3,705,620 (KAYATZ). The bulk material trickles over bundles of heat exchanger coils to the outlet.

The subject matter of U.S. Pat. No. 3,866,673 (PAVLOV) is a heat exchanger for cooling ore slags, but in which no cooling tubes but cooling coils are used. A similar device with a heating coil is disclosed in DE 10 2009 054 354 B3 (SORG); However, this plant refers to dewatering and heating mixtures for the manufacture of glass.

From an engineering point of view, however, it would be preferable using water vapors instead for the heating of water, which in turn is then used as a heat exchange liquid, using them for heat exchange. In this way, the heat could be used directly and a heat exchange at a higher level can be achieved. So far, however, this fails because the vapors in the exchanger partially condense, which can lead to corrosion damage, caking and clogging, which then lead to significant downtime for maintenance, repair and cleaning.

The object of the present invention has therefore been to provide heat exchangers for solid free-flowing bulk materials which are free from the disadvantages described above.

In particular, the components should have high efficiency, i.e. compared to the state of the art an improved heat exchange performance, be easy to be adapted to bulk materials with a variety of trickle properties, be easy in maintenance and installation and allow the use of different heating or cooling media, in particular unpurified vapors.

BRIEF SUMMARY

The invention relates to a novel solid heat exchanger module containing a plurality of heat exchanger tubes having a particular shape and being arranged in a special manner.

DETAILED DESCRIPTION

A first object of the invention relates to a solid state heat exchanger module comprising or consisting of
(i) a closed housing for receiving heat exchanger tubes;
(ii) a plurality of heat exchanger tubes;
(iii) at least one substance inlet;
(iv) at least one substance outlet;
(v) pipe connections between the heat exchanger tubes for supply with heating or cooling media,
in which
(a) the heat exchanger tubes are grouped in bundles, each offset from one another,
(h) each module contains 2 to 10 bundles,
(c) each bundle contains 10 to 100 tubes,
(d) each tube has a rectangular or rhombic cross-section with rounded edges with the angles $\alpha$, $\beta$, $\gamma$ and $\delta$, for which angle the selection conditions apply, and α=30° to 120°
β=60° to 150°
γ=30° to 120°
δ=60° to 150°
with the proviso that the sum of all angles gives 360 and
(e) the distance D1 between each two adjacent heat exchanger tubes in a row and the distance D2 between each two adjacent heat exchanger tubes in two adjacent rows is independently between 10 and 100 mm.

The problem described infra is completely solved with a component as described above. Instead of plates, only heat exchanger tubes are used, which are arranged in a special way, so that blockage of the system is excluded. The combination of pipe spacing and pipe geometry makes it possible for the first time to carry out the heat transfer with the aid of unpurified vapors, since the turbulent flow produced in this way increases the speed of the vapors to such an extent that undesired condensation is avoided and the heat exchange is correspondingly increased. In this way, the module can also be constructed in a closed manner without running the risk that the side walls warp through the contacts of the hot bulk good.

The cross section of the tubes and their distance can be adapted to the nature of the bulk material, in particular its slope angle and the desired flow rates, especially with regard to the wall friction angle. The tubes can have a round cross section; preferably they are square or rhombic with curves that are adapted to the angle of repose of the bulk material, so that the solid can flow around the tubes as long as possible. In this way, the time for the heat exchange is extended, which significantly improves the efficiency in terms of heat transfer per unit volume. This makes it possible to produce heat exchangers which are significantly more compact than the comparison components from the prior art and nevertheless yield higher heat exchanger outputs.

Solid-State Heat Exchanger Modules

Figure 2:
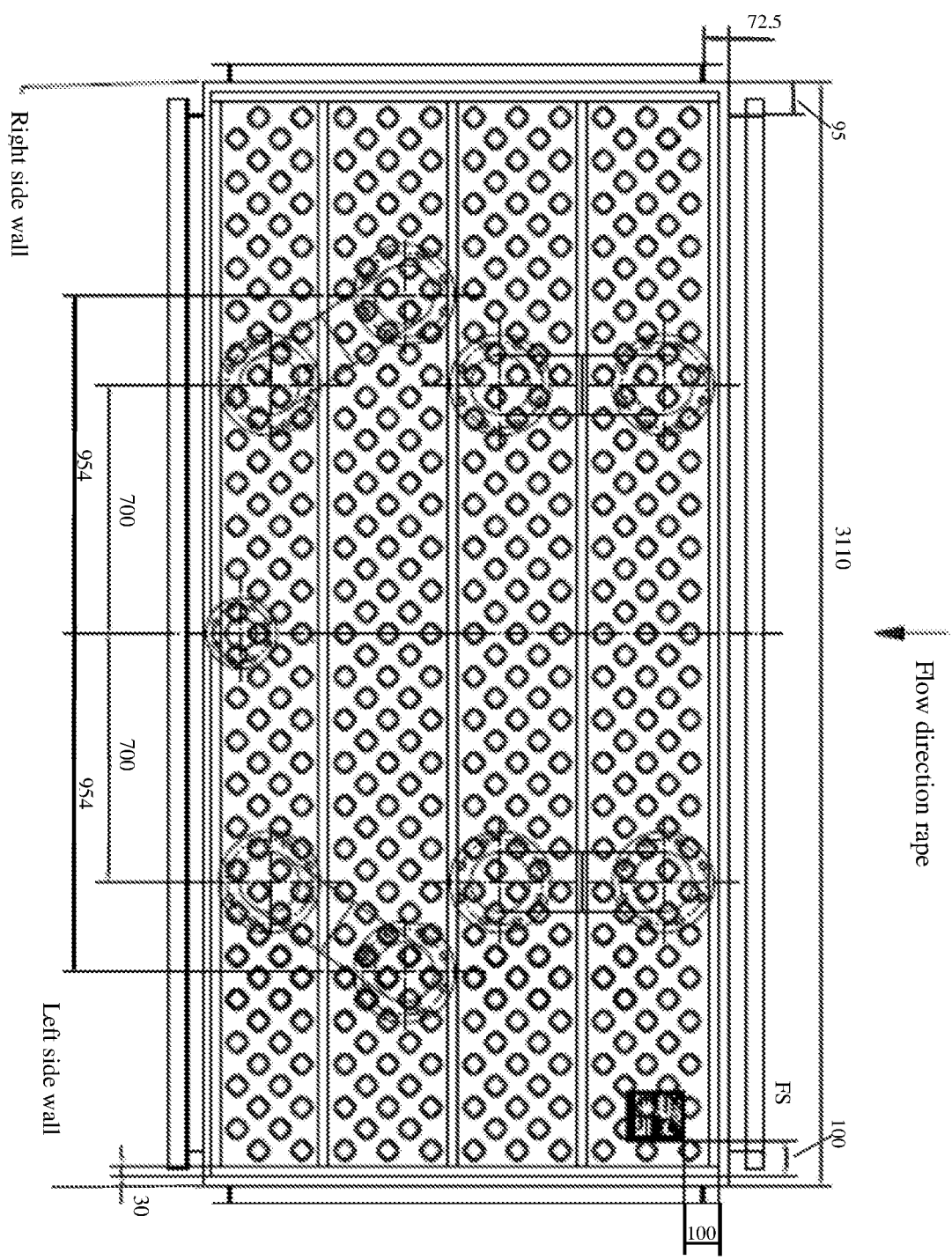

The heat exchanger modules contain said heat exchanger tubes arranged in the form of several, preferably 2 to about 5 bundles. In each tube bundle, the tubes are arranged in rows one above the other. Preferably, the bundles contain from 2 to about 10, and more preferably from about 4 to about 6, rows of about 10 to about 50, and more preferably about 20 to 50 tubes each, as shown in FIG. 1. With reference to the rows of tubes in the bundles, the tubes are in each case staggered with respect to one another, as shown in FIG. 2. The details of pipes and tube bundles are to be understood as preferred and typical embodiments. It is basically possible to produce larger systems, which then have correspondingly larger numbers of pipes and tube bundles.

Figure 6:
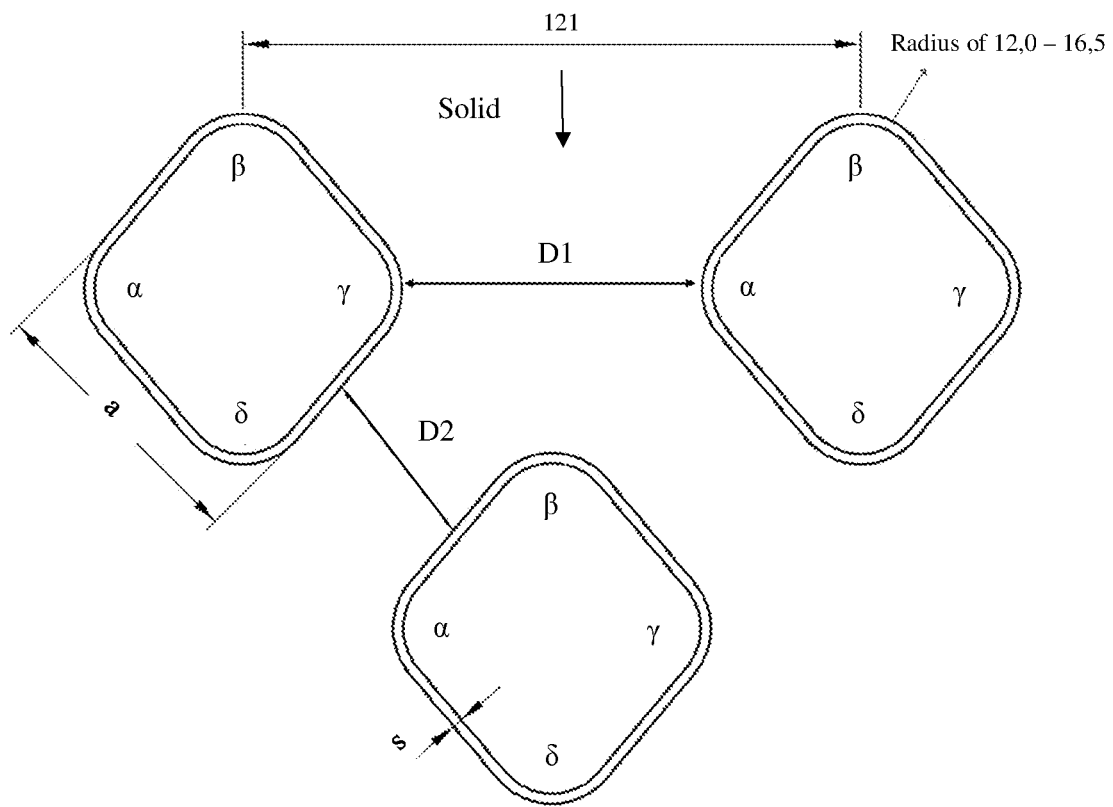

The distance D1 between each two adjacent heat exchanger tubes in a row and the distance D2 between each two adjacent heat exchanger tubes in two adjacent rows may be independently between about 10 and about 100 mm and preferably between about 40 to about 60 mm (see also FIG. 6).

The heat exchanger tubes are either individually, but preferably in bundles connected to a manifold, via which the heating or cooling liquids can be fed (see FIG. 1, arcuate connections above and below the tube bundle; FIG. 2, circular structure showing the connection to the manifold show, and FIG. 4). The tube bundles can each be operated together via a distributor; however, it is also possible to supply all bundles and thus all pipes together via a main and optionally further secondary distributors with the media.

The heat exchanger tubes can be heated or cooled with liquids, vapors, gases, cooling water and corresponding mixtures. In particular, however, they are operated with unpurified vapors, which make the implementation particularly simple and inexpensive. In this way, the condensation heat of water vapor over 100° C. can be used directly on the inside of the tube. On the other hand, if the brine vapors were used to produce hot water, only temperatures of 60 to 65° C. could be reached.

Heat Exchanger Tubes

Although the heat exchanger tubes may have a round or oval diameter in the context of the present invention, their profile is preferably rectangular or rhombic, wherein the edges are rounded so that the bulk material can flow around the pipe as long as possible and thereby increases the heat exchange period.

Another object of the invention therefore relates to a heat exchanger tube, which is characterized in that it has a rectangular or rhombic profile with the angles α, β, γ and δ, wherein the following selection conditions apply to these angles
α=30° to 120°
β=60° to 150°
γ=30° to 120°
δ=60° to 150°
with the proviso that the sum of all angles gives 360° (see FIG. 6). In a first preferred embodiment, the four angles are equal and are 90°, in a second embodiment, two opposite angles to one are about 80° and the other about 100°. The pipes are installed in the module in such a way that the opposite smaller angles of the pipe cross-section point in the direction of the flow direction.

The diameter of the heat exchanger tubes (d1) is not very critical and may typically be between about 20 and about 100 mm, preferably between about 30 and about 80 mm, and most preferably between about 40 and about 60 mm. The length of the pipes depends on the dimensions of the heat exchanger module and can be between 1 and 20 meters. Highly strength and corrosion-resistant commercial steels and special steels are mainly used.

Solid-State Heat Exchanger

Another object of the invention relates to a solid-state heat exchanger containing or consisting of at least two, preferably 3, 4, 5 or up to 10 of the modules described above. An illustration of a heat exchanger with five modules is shown in FIG. 5.

Figure 5:
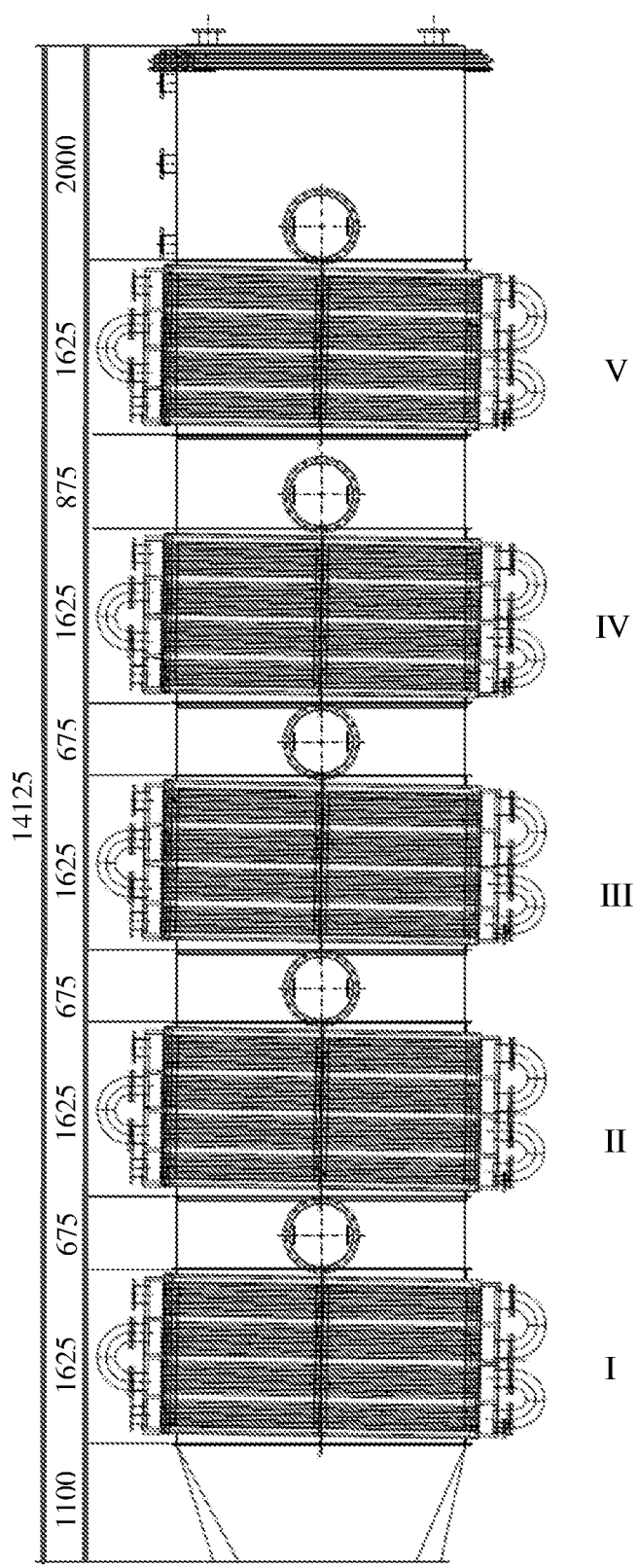

In this case, the bulk material is fed at the top of the heat exchanger, specifically fed at the top of the highest exchanger module (FIG. 5, above). This can be done via a bulkhead or a hatch, for example by continuous introduction via a conveyor belt. However, the bulk material can also be placed over the entire available area of the module. The discharge of the treated bulk material takes place at the bottom of the heat exchanger or the lowermost module, for example through a lock (FIG. 5, bottom). Also other conventional discharge conveyors can be taken into account, whose number depends on the cross section of the selected manhole dimensions.

The individual modules are preferably connected to each other via connecting boxes with or without vapor exhaustion (FIG. 5, components between the modules), so that they can be coupled and disconnected. Therefore, they are preferably movable on rollers and extendable. In this way it is achieved that a module that needs to be replaced and maintained or repaired, can simply be extended and the heat exchanger can still continue to operate. It is also preferred to arrange the modules tilted with tilt angle. In this way, the tubes in the interior clean themselves by the condensed gases. The condensates are collected at the low points and discharged.

It is also advantageous to equip the intermediate boxes with manholes, through which a further mechanical cleaning of the tube bundle heat exchanger along the pipe routes—if necessary—can be done.

The entire construction can be made using highly strength and corrosion-resistant commercial and special steels. The design can be pressure-resistant, depending on the material thickness, also e.g. 13 bar overpressure through the pipes (proof of calculation with the finite element method).

INDUSTRIAL APPLICATION

Another object of the invention concerns a process for the treatment of free-flowing bulk material, in particular for heating or cooling it, by which the material is subjected to a heat exchange using at least one solid heat exchanger module as explained above. In this case, bulk material can be used which is selected from the group consisting of seeds, sands and polymer-crumb or other substances or free-flowing bulk materials which are to be heated or cooled.

Another subject-matter of the invention relates to the use of the heat exchanger module as described above for the treatment of pourable bulk material.

In the following, the invention is further described through 6 figures without limiting it thereto.

Example 1

The preheating of rapeseed (average diameter per particle: about 2 mm) was carried out in a tube bundle type solid heat exchanger according to the invention, which contained a total of 5 modules and had a height of 20 m. Each module contained 5 bundles of heat exchanger tubes arranged offset per bundle in 4 rows of 20 tubes each (analogous to FIGS. 2 and 3). The diameter of the tubes was 51 mm, the distances D1 and D2 was each 43 mm. The tubes themselves had a rhombic profile, with the following angles:
$\alpha=80°$
$\beta=100°$
$\gamma=80°$
$\delta=100°$ The bulk material had at the top of the heat exchanger a temperature of 25° C. and a humidity of 9 wt.-%. The exchanger was operated with unpurified vapors (from seed conditioning and scrap drying) and vapor water at a temperature of about 60° C. At the outlet, the bulk material had a temperature of 50° C. and a residual moisture content of 8% by weight.

Example 2

The preheating of broken soybeans (maximum length: approx. 6 mm) was carried out in a tube bundle type solid heat exchanger according to the invention, which contained a total of 5 modules and had a height of 20 m. Each module contained 5 bundles of heat exchanger tubes arranged per bundle offset from one another in 4 rows of 20 tubes each (analogous to FIGS. 2 and 3). The diameter of the tubes was 51 mm, the distances D1 and D2 each 43 mm. The tubes themselves had a rhombic profile, with the following angles:
$\alpha=80°$
$\beta=100°$
$\gamma=80°$
$\delta=100°$ The bulk material had at the top of the heat exchanger a temperature of 25° C. and a humidity of 8 wt.-%. The exchanger was operated with unpurified vapors (from seed conditioning and scrap drying) and vapor water at a temperature of about 100° C. At the outlet, the bulk material had a temperature of 50° C. and a residual moisture content of 7.5% by weight.

SHORT EXPLANATION OF THE FIGURES

Figure 3:
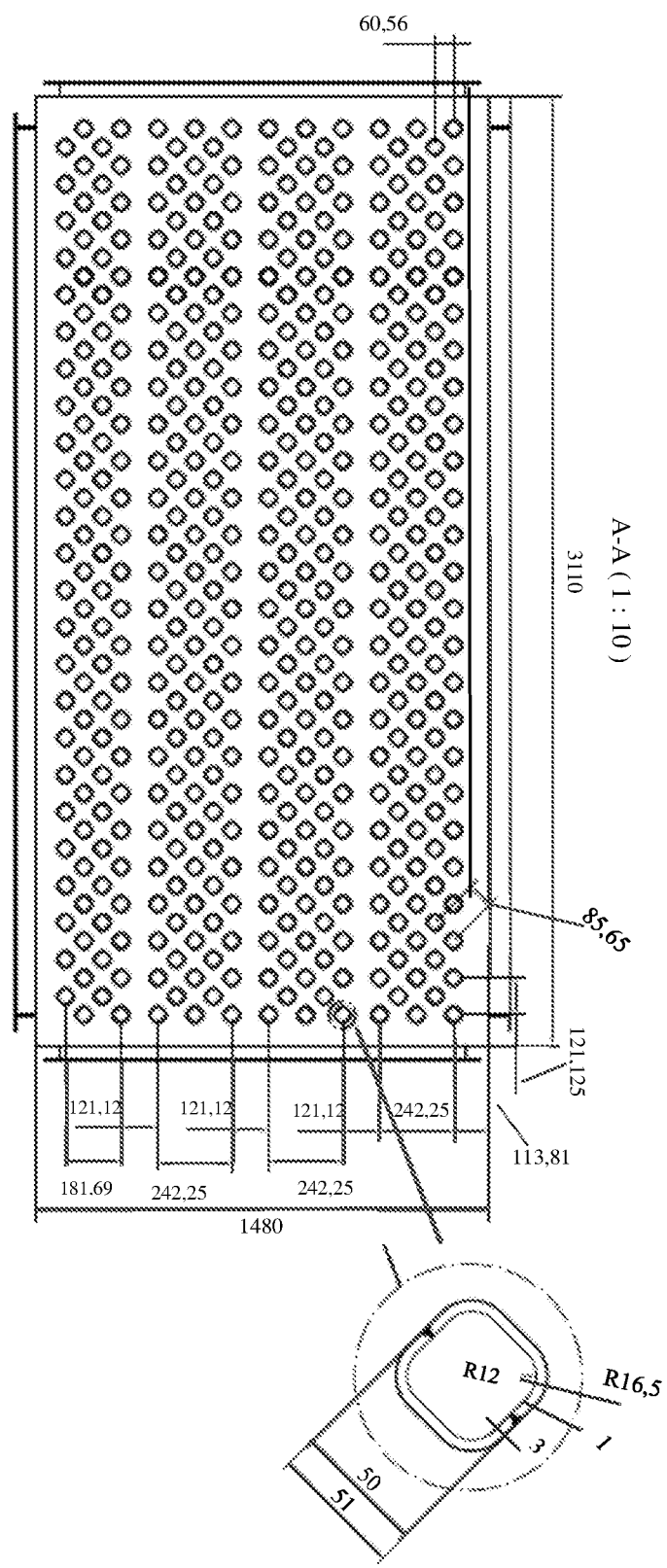
Figure 4:
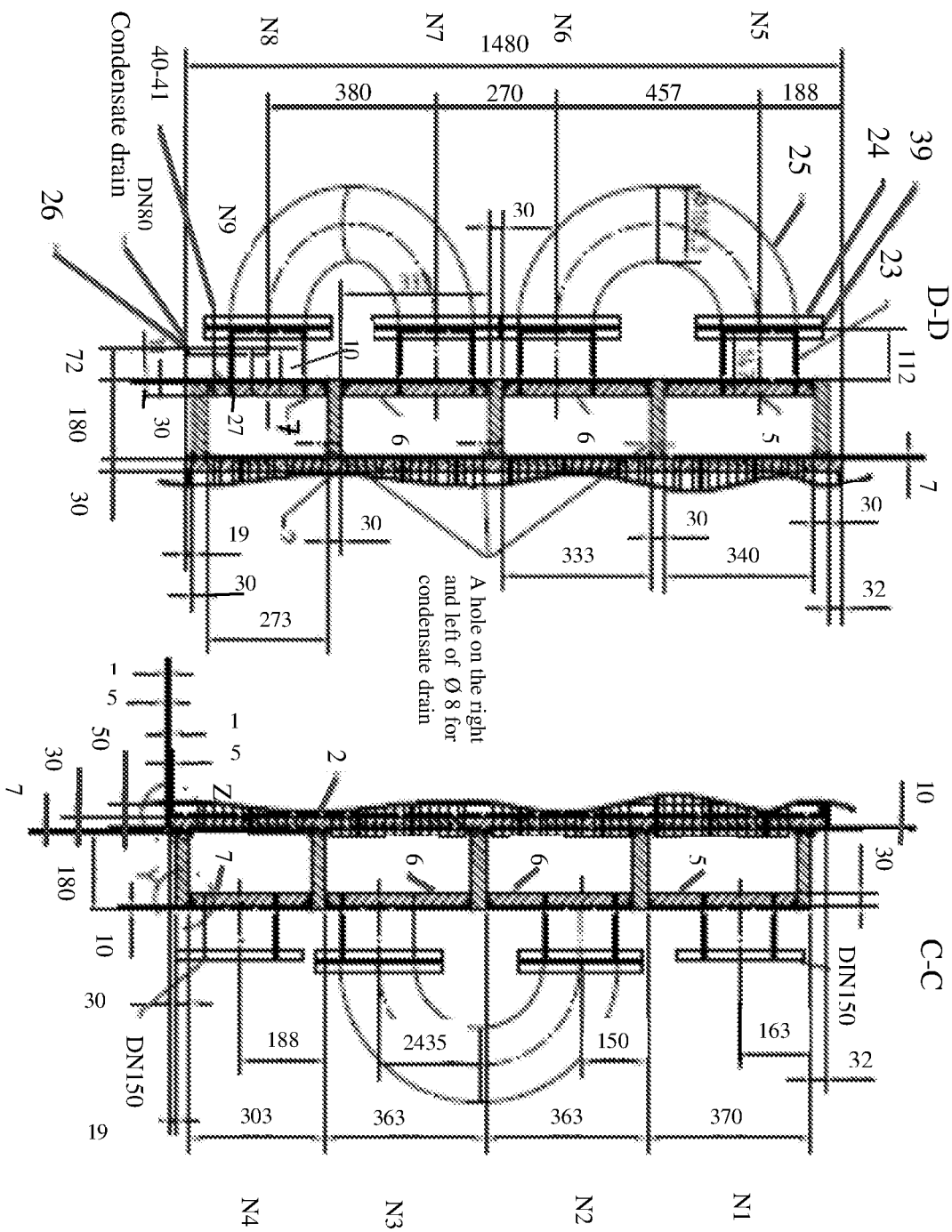

FIG. 1
Vertical section through a heat exchanger module with 4 tube groups. The flow direction of the bulk material runs from right to left.
FIG. 2
Horizontal section through a heat exchanger module with 5 tube groups. The flow direction of the bulk material runs from right to left.
FIG. 3
1 bundle with 4 tube groups. Shown is also the profile of a hex exchange tube.
FIG. 4
Detail of the distributor head
FIG. 5
Arrangement of 5 heat exchanger modules in a composite
FIG. 6
Cross section of an arrangement of 3 heat exchanger tubes in two adjacent rows.

What claimed is:
1. A solid state heat exchanger module comprising
(i) a closed housing for receiving heat exchanger tubes;
(ii) a plurality of heat exchanger tubes;
(iii) at least one substance inlet;
(iv) at least one substance outlet;
(v) pipe connections between the heat exchanger tubes for supply with heating or cooling media,
in which
(a) the heat exchanger tubes are grouped in bundles, each offset from one another,
(b) each module contains 2 to 10 bundles,
(c) each bundle contains 10 to 100 tubes,
(d) each tube has a rectangular or rhombic cross-section with rounded edges with the angles $\alpha$, $\beta$, $\gamma$ and $\delta$, for which angle the selection conditions apply, and
$\alpha=30°$ to $120°$
$\beta=60°$ to $150°$
$\gamma=30°$ to $120°$
$\delta=60°$ to $150°$
with the proviso that the sum of all angles gives 360°
(e) the tubes are arranged in the tube bundle in such a way that the angles $\beta$ and $\delta$ each point up and down and the angles $\alpha$ and $\gamma$ each point right and left, and
(f) the distance D1, between each two adjacent heat exchanger tubes in a row and the distance D2 between each two adjacent heat exchanger tubes in two adjacent rows is independently between 10 and 100 mm,
provided that the module has rollers so that it can be moved and extended when installed.

2. The module of claim 1, wherein the heat exchanger tubes in the bundles each offset to each other are arranged in 2 to 10 rows.

3. The module of claim 1, wherein the heat exchanger tubes in the bundle each have a diameter d1 in the range of 20 to 100) mm.

4. The module of claim 1, wherein the heat exchanger tubes are connected via a distributor for receiving the heating or cooling liquid.

5. The module of claim 1, wherein the heat exchanger tubes are heated or cooled with liquids, vapors, steam, gases, cooling water and corresponding mixtures.

6. The module of claim 1, wherein the heat exchanger tubes are heated with unpurified vapors.

7. A solid state heat exchanger comprising at least two modules according to claim 1.

8. The heat exchanger of claim 7, wherein said modules are interconnected via boxes.

9. The heat exchanger of claim 1, wherein said modules can be overturned in said boxes.

10. The heat exchanger of claim 1, wherein said modules are movable and extendable via rolls.

11. A method for the treatment of free-flowing bulk material, comprising
   (a) providing the solid state heat exchanger of claim 7,
   (b) feeding said bulk material to the inlet of said heat exchanger, and
   (c) collecting the treated bulk material from the outlet of said heat exchanger.

12. The method of claim 11, wherein the bulk material is selected from the group consisting of seeds, sands and polymer grits.

\* \* \* \* \*